(12) United States Patent
Dixon (10) Patent No.: US 10,237,165 B2
(45) Date of Patent: Mar. 19, 2019

(54) DATA TRAFFIC MANAGEMENT SYSTEM AND METHOD

(71) Applicant: Jason Dixon, Canton, GA (US)

(72) Inventor: Jason Dixon, Canton, GA (US)

( * ) Notice: Subject to any disclaimer, the term of this patent is extended or adjusted under 35 U.S.C. 154(b) by 81 days.

(21) Appl. No.: 15/621,557

(22) Filed: Jun. 13, 2017

(65) Prior Publication Data
US 2017/0359247 A1 Dec. 14, 2017

Related U.S. Application Data

(60) Provisional application No. 62/349,423, filed on Jun. 13, 2016.

(51) Int. Cl.
| | |
|---|---|
| *H04L 12/50* | (2006.01) |
| *H04L 12/715* | (2013.01) |
| *H04L 12/721* | (2013.01) |
| *H04L 12/24* | (2006.01) |
| *H04W 28/10* | (2009.01) |

(52) U.S. Cl.
CPC .............. *H04L 45/04* (2013.01); *H04L 41/50* (2013.01); *H04L 45/123* (2013.01); *H04L 41/0823* (2013.01); *H04W 28/10* (2013.01)

(58) Field of Classification Search
CPC ........................................................ H04L 12/50
USPC ........................................................ 370/401
See application file for complete search history.

(56) References Cited

U.S. PATENT DOCUMENTS

2015/0016286 A1\* 1/2015 Ganichev ............ H04L 12/4633
370/252

\* cited by examiner

*Primary Examiner* — Dang T Ton
(74) *Attorney, Agent, or Firm* — Leyendecker & Lemire, LLC (57) ABSTRACT

A data traffic management system and method is described. Embodiments of the data traffic management system and method can include creating a plurality of tunnels in a communications network between a data center and a remote network. A failover solution of tearing down a tunnel when an issue is detected and immediately transferring data traffic to a second tunnel is provided. The plurality of data tunnels can be continuously monitored to ensure a viable data tunnel is available when a primary data tunnel fails.

20 Claims, 4 Drawing Sheets

DATA TRAFFIC MANAGEMENT SYSTEM AND METHOD

CROSS-REFERENCE TO RELATED APPLICATION

This application claims the benefit of U.S. Provisional Application No. 62/349,423, filed Jun. 13, 2016.

BACKGROUND

Currently, service providers are limited to the options they can provide when it comes to getting voice, video, and data transmissions over to a redundant circuit after a primary circuit fails. Further, service providers are often times limited in how fast they can move the traffic over after a failure to get the site back up and running and how well traffic can be moved to the secondary (or redundant) circuit. Typically, the transition is not seamless and is extremely interruptive to those utilizing the circuits. Customers are being limited to how well their traffic will perform across the circuits before, during, and after a failover simply because customers and service providers only have visibility into one small piece of an actual transmission that is going from a branch office to a data center and vice versa.

To further complicate the lack of visibility by the service providers, there are usually several local exchange carriers (LEC) involved in a single packet getting from point A (e.g., a branch office) to point B (e.g., a customer/client calling in to get assistance in the form of some sort of service from a professional at the branch office). Many times a single circuit at a single location will have one or more LECs involved, and sometimes more than three involved. Typically, an organization that has purchased a circuit from a service provider does not know that the service provider has to utilize a LEC for last mile connectivity. Many times, the service provider will utilize multiple LECs depending on the needs of the service provider to get the circuit connected. This means that the service provider has less visibility and control over even a single circuit purchased from them than what an organization purchasing the circuit from the service provider is thinking. This makes it very hard most of the time to troubleshoot issues and get service levels met, since there are multiple entities involved with one circuit and usually multiple circuits for a single transmission, which compounds dependencies and problems.

In most cases, there are multiple LECs as well as multiple service providers with multiple LECs, making it very hard to get true end-to-end visibility and optimization. Problems arise when trying to (i) ensure proper service levels (e.g., quality of service) before failover, (ii) ensure proper failover, and (iii) ensure proper service levels and connectivity during failover. For instance, the lack of end-to-end visibility can force traffic patterns to take sub-optimal/asymmetric paths that create poor performance of transmissions and many times create a complete loss of connectivity due to firewall stateful failures and/or traffic being blackholed due to lack of routing knowledge of the destination. Further, with current setups, it is very hard to ensure proper restoration after original primary circuits come back up after failing.

Many times, when a primary circuit fails, organizations are forced to just wait it out and to try and do as much as they can in a damage control mode over the secondary circuit until the actual primary circuit comes back online. Typically, the transition to get to the backup circuit and have the backup circuit operate at a level the organization needs is too arduous. Then, with a flapping primary circuit (e.g., where the primary circuit constantly goes up and down), this creates multiple problems for an organization. Even if the circuit is not flapping, the organization ends up dropping a plurality of calls and conferences or dropping business critical transaction data during the failure that the failure has hurt them immensely before the organization can even get over to the backup circuit.

DETAILED DESCRIPTION

Embodiments of the present invention include a data traffic management system and method(s) of use. The system can generally be implemented in a communications network to increase reliability of data transfer over the network. In one embodiment, the system can implement tunnels including, but not limited to, generic routing encapsulation (GRE) tunnels, internet protocol over internet protocol (IP over IP) tunnels, internet protocol security (IPsec) tunnels, multiprotocol label switching (MPLS) tunnels, and/or a different type of tunnel created and/or utilized specifically for a specific vendor, that can be built between remote processing centers and a central data center(s) of the communications network. The tunnels can be configured to traverse over any provider and any circuit or media included between the remote processing centers and the central data centers. The tunnels can be implemented to provide media, circuit, local exchange carrier (LEC), and device independence from any other entity.

Typically, the tunnels can be set up so that endpoint devices of the tunnels can continuously monitor a complete status of each tunnel by utilizing several different technologies, innovations, and methods. These technologies, innovations, and methods can range from customized, created, and/or modified "are you there" and/or "what is your site's status for handling transmissions right now" messages (set at intervals that are comfortable for the vendor gear to handle efficiently but that also ensure that in the event of a failure nothing is noticed at all by the users on the voice, video, or data transmission), to modified/updated code/image logic, and/or the addition and/or mixture of routing protocol logic, and/or the addition of and/or modification of routing protocol messages and/or other protocol and/or technology, that are built into Open Shortest Path First protocol (OSPF), and/or Enhanced Interior Gateway Routing Protocol (EIGRP), and/or bidirectional forwarding detection (BFD), and/or IP service Level Agreement (IP SLA), and/or border gateway protocol (BGP), and/or static routing, and/or route tracking, and/or interface Tracking, and/or Enhanced Object Tracking, and/or Object Tracking, and/or failover and stateful failover, and/or routing information protocol version 2 (RIPV2), and/or hot standby router protocol (HSRP), and/or virtual router redundancy protocol (VRRP), and/or gateway load balancing protocol (GLBP), and/or security technology implementation and logic, and/or vendor specific components and configuration, and/or code or image modifications and/or circuit updates necessary, and/or any other messages that are able to be set to detect a failure within time constraints needed to achieve the goals set out to achieve, all rolled into a concoction of a very specific logic. Typically, the messages can be sent at timed intervals that are comfortable for a particular vendor's hardware to handle efficiently, but that also ensure that in the event of a failure nothing will be noticed by users having voice, video, or data transmissions.

In the event of a failure of any kind (e.g., circuit, device, cable or any other component of a vendor's system), the system can include sensing and remediation mechanisms for transferring data from one tunnel to another tunnel. Typically, the remediation mechanisms can include two basic steps depending on the failure. First, all devices that need to be notified can be notified immediately (e.g., within milliseconds depending on the optimized testing of the site during implementation). Second, based on the notification, the notified devices immediately update their logic to route to the next tunnel. Updating the devices' logic can include, but is not limited to, updating all of the necessary devices' routing tables, and/or forwarding tables, and if necessary connection tables are updated and also optimized accordingly throughout the entire network, and therefore transmission links/paths are switched and optimized for every device in the network as soon as there is an outage so that the outage is fully avoided and there are no performance impacts at all to voice, video, and data transmissions.

As can be appreciated, each of the devices within the communications network can almost immediately be on the same page as the device where an outage has happened. For example, if there is an outage at the remote processing center, all the necessary devices (e.g., firewalls and all other devices that go to the resources needed) at both the data center and the remote processing center, regardless of which center, service provider or LEC actually had the outage, will have their logic updated and will immediately build and/or start to utilize the proper connections that ensure that there are no dropped calls, video, or data sessions and ensure that there is no degradation in service to these transmissions.

When the system detects an outage at a currently traversed tunnel, traffic can be placed on a tunnel having a paired circuit or circuits that are still operational at the other location (location that didn't have the outage initially) to ensure that all devices at the location where the outage did not occur are properly notified to make the proper adjustments to their logic as well because something has happened that requires immediate action and every device in the network must be on the same page to ensure the proper quality of service and unnoticed failover to the end users.

In instances where two data centers are implemented, the system can add an additional link between the two data centers. The link between a primary data center and a secondary data center can be set up in a like manner with a plurality of tunnels. The system can ensure that if the communications circuit(s) (or routers) were to go down at the same time as the first data center, the system can failover and traverse the still active secondary data center and can go over the additional link between the two data centers. By implementing the link between the two data centers, the system can ensure that the network does not drop voice, video, or data transmissions. As can be appreciated, the system can accomplish this with no re-registrations even though both active links at the primary data center went down at the same time.

In one embodiment, the system can implement secure transmission technologies so that all transmissions across any media or circuit in the system can be protected at all times with the highest level of Internet Protocol Security mechanisms. For instance, secure transmission technologies can include, but are not limited to, encapsulating security protocol (ESP) and/or authentication header (AH) technologies. Generally, all transmissions can be treated with service level parameters by ensuring that voice and video are prioritized, no matter what media, circuit, or failover situation happens at any given time.

The system can monitor all service provider failures and provide a report each month that shows how many failures the service provider circuits had that were not noticed by the users. The system can be implemented to save millions in penalty costs for service providers having circuits go down.

Embodiments of the present invention can be vendor neutral such that the system can be implemented with any vendor's network hardware (or gear). As can be appreciated, the system can be implemented in any environment so that an organization does not have to re-invest in new hardware to use the system and see the aforementioned advantages. As can be appreciated, there may be certain differences that may be warranted as far as the code/images modifications and/or configurations go between the different vendors just due to the basic differences of being different vendors with different devices that have different logic. The system can be implemented on top of these existing logics and devices.

For example, for a vendor "A", the following may be utilized: Open Shortest Path First (OSPF), IP over IP Tunnel, Authentication Header, the creation of a vendor specific "are you there" and/or "what is your site's status for handling transmissions right now" messages, a modification/update of the code/image logic along with all the other components and configuration and/or code or image changes and circuit updates necessary. For a vendor "B", they may utilize the following: Enhanced Interior Gateway Routing protocol (EIGRP) with modified hello and hold timers, GRE, Encapsulating Security Protocol (ESP), Firewall Filter changes as well as the change in the method of operation of the Firewall and/or router in a given environment, along with all the other components and configuration and/or code or image changes and circuit updates necessary. For a vendor "C", they may utilize Border Gateway Protocol (BGP), GRE (where the vendor code/image logic may require modification), Bidirectional Forwarding Detection (BFD), ESP, along with all the other components and configuration and/or code or image changes and circuit updates necessary.

The system can be substantially vendor neutral. In some embodiments, depending on a particular vendor, code adjustments, protocols, configurations, and other adjustments may be needed for a particular vendor.

Embodiments of the present invention can ensure that transmissions are able to take alternate paths with no issues and ensure that when a primary circuit recovers that there are no re-registrations and no service interruptions that happen due to the built in mechanisms described previously. An effect due to link flapping can be minimized so that link flapping has no impact on performance and is not noticed by anyone participating with the transmissions being transmitted on the flapping circuit.

Described hereinafter is an example implementation of the system. Multiple IP Sec, IP over IP, GRE, MPLS, or a different type of tunnel can be created and/or utilized specifically for a particular vendor. The tunnels can be built between a remote processing center and the one or more data centers. The system can continuously monitor data transmissions on the previously built tunnels. The monitoring can begin with customized, created, and/or modified "are you there" and/or what is your site's status for handling transmissions right now" messages, (e.g., set at intervals that can be comfortable for the vendor gear to handle efficiently but that may also ensure that in the event of a failure nothing may be noticed by users on the voice, video, or data transmission), and/or modified/updated code/image logic, and/or the addition and/or mixture of routing protocol logic, and/or the addition of and/or modification of routing protocol messages and/or other protocol and/or technology, that are built into Open Shortest Path First protocol (OSPF), and/or Enhanced Interior Gateway Routing Protocol (EIGRP), and/or bidirectional forwarding detection (BFD), and/or IP service Level Agreement (IP SLA), and/or border gateway protocol (BGP), and/or static routing, and/or route tracking, and/or interface tracking, and/or enhanced object tracking, and/or object tracking, and/or failover and stateful failover, and/or routing information protocol version 2 (RIPV2), and/or hot standby router protocol (HSRP), and/or virtual router redundancy protocol (VRRP), and/or gateway load balancing protocol (GLBP), and/or security technology implementation and logic, and/or vendor specific components and configuration, and/or code or image modifications and/or circuit updates necessary, and/or any other messages that are able to be set to detect a failure in within the time constraints needed to achieve the goals set out to be achieved. Typically, the messages can be sent at intervals that are comfortable for the vendor gear to handle efficiently. The messages can be continuously sent back and forth between edge devices implemented as endpoint devices of the tunnels that were created for the communications network. All possible traffic paths can be monitored at all times so that traffic is never moved to a worse link than the one it is on, causing unnecessary transitions. If there is an issue that happens in the service provider or LEC clouds that causes the messages to not arrive in their allotted time frame, or arrive malformed in any way, the system can immediately remediate and move all traffic symmetrically to an alternate service provider and LEC, internet connection, private line, etc. and send the data transmissions via another tunnel previously created. The system can continue to monitor the circuit that is down (along with all other circuits in the system) while production traffic is uninterrupted and traversing the healthy circuit normally. Continuous monitoring by the system can detect the restoration of the circuit that went down and after proper parameters are verified, to ensure the circuit is truly ready to accept production traffic again, the system can place the original primary circuit back into production and seamlessly place production traffic back on the primary circuit with substantially no interruptions at all. Monitoring by the system can continue before, during, and after all transitions at all times.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The terms "circuit" and "network," as used in this specification and the appended claims, can refer to, but is not limited to, a multi-protocol label switching (MPLS) circuit/network, an asynchronous transfer mode (ATM) circuit/network, a frame relay circuit/network, an Ethernet circuit/network, a packet over synchronous optical network, a point-to-point circuit/network, a point-to-multipoint circuit/network, an internet circuit/network, a synchronous optical network (SONET) circuit/network, any optical carrier circuit/network, any digital signal circuit/network, any T-carrier circuit/network, a metro Ethernet circuit/network, and/or any other circuit/network that transmits voice and/or, video, and/or data transmissions.

A Method of Implementing a Data Traffic Management System

Figure 1:
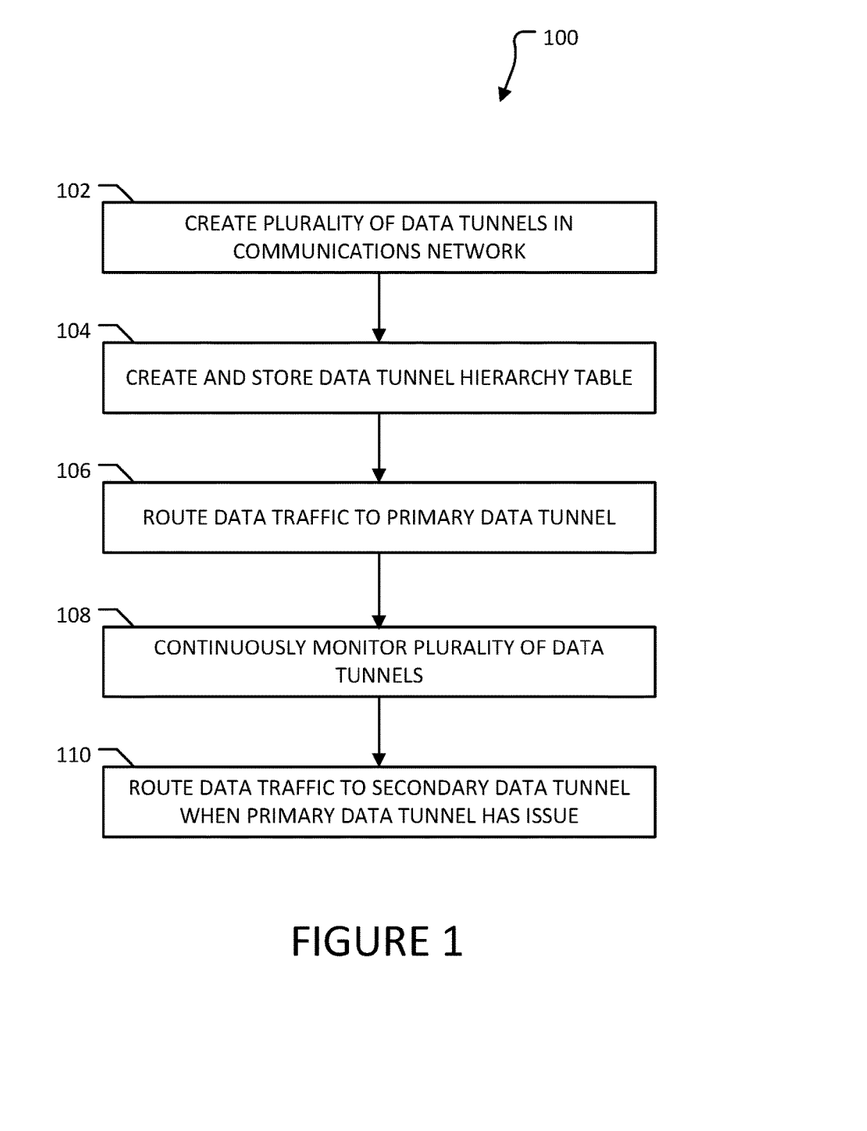
FIG. 1 is a flow chart of a data traffic management process according to one embodiment of the present invention.

Referring to FIG. 1, a flow chart of a method or process 100 for creating and implementing a data traffic management system in a communications network is illustrated. Typically, the method 100 can be implemented to provide uninterrupted service to end users in a communications network.

In block 102, a plurality of data tunnels can be created in the communications network. Typically, the communications network can include, but is not limited to, at least one data center and a remote processing center (e.g., remote communications network). The plurality of data tunnels can be configured to traverse along different paths between the at least one data center and the remote processing center. Typically, the at least one data center and the remote processing center can each include at least two devices that can be implemented as endpoint devices for the plurality of data tunnels. In one example, edge devices of the remote processing center and the data center can be implemented as the endpoint devices. Each of the plurality of data tunnels can include a first endpoint device at the data center and a second endpoint device at the remote processing center. In one example, the endpoint devices can be service provider network devices (e.g., routers) connecting the data center and the remote processing center to an intermediary network. For instance, the endpoint devices can be edge devices.

In block 104, a hierarchy table can be created and provided for the plurality of data tunnels to each of the endpoint devices. The hierarchy table can typically be stored by, and accessible to, the endpoint devices. The hierarchy table can list a primary data tunnel, a secondary data tunnel, a tertiary data tunnel, etc. for the plurality of data tunnels. Typically, the primary data tunnel can be a preferred data tunnel for the communications network. In one embodiment, the primary data tunnel may include devices in the communications network with high reliability. In one embodiment, the hierarchy table can be provided or accessible by each device directly connected, or indirectly connected, to each of the endpoint devices. Typically, the hierarchy table can include a current status indicator for each of the data tunnels. The current status can be continuously updated by each of the endpoint devices to ensure data traffic can be routed to a currently active data tunnel when a currently traversed data tunnel experiences issues. In one example, the current status indicator may include a simple "up" for a data tunnel experiencing no issues and a simple "down" for a data tunnel experiencing issues.

After the plurality of data tunnels have been created and the hierarchy table has been provided to each of the endpoint devices, the process 100 can move to block 106. In block 106, data traffic of the communications network can be routed to the primary data tunnel of the plurality of data tunnels based on the hierarchy table. Typically, data traffic can traverse the primary data tunnel until an issue has been detected with the primary data tunnel.

In block 108, the plurality of data tunnels can be continuously monitored to determine if any of the plurality of data tunnels is having issues transmitting data. Typically, the endpoint devices of each of the plurality of data tunnels can be configured to both send update packets to one another and determine if the update packets have been received within a predetermined amount of time. For instance, a first update packet can be continuously sent from the first endpoint device to the second endpoint device for each of the plurality of tunnels. The second endpoint device can be configured to continuously determine if the first update packet was received within a predetermined amount of time from the first endpoint device. A second update packet can be continuously sent from the second endpoint device to the first endpoint device. The first endpoint device can be configured to determine if the second update packet was received in a predetermined amount of time from the second endpoint device.

Typically, the endpoint devices can be configured to monitor the update packets and send an updated update packet to other endpoint and/or network and/or security devices if an endpoint device detects an issue. For instance, if the first endpoint device determines that the second update packet was not received within the predetermined amount of time, the first endpoint device can generate and send out an updated update packet to each of the other endpoint and/or network and/or security devices that the primary tunnel is experiencing issues and data traffic should be routed to the secondary data tunnel in the hierarchy table. Further, the first endpoint device may send the updated update packet to each internal device of the data center. In one example, the updated update packet can include instructions to update a routing table, a connection table, and/or a forwarding table of each device connected to the endpoint devices. In another example, the updated update packet can include instructions for each endpoint device to update a forwarding path of each device directly connected to, or indirectly connected to, that endpoint device of the next data tunnel to direct traffic to. For instance, the updated update packet can include instructions to refer to the hierarchy table to determine which data tunnel to direct traffic to. In one embodiment, the endpoint device can reference the hierarchy table to determine which data tunnel data traffic should be routed to while generating the updated update packet. As can be appreciated, if the first endpoint device determines the second update packet was late, the first data packet traversing the data tunnel will experience the same issue and the second endpoint device may also determine that the data tunnel is experiencing issues. The second endpoint device may then generate an updated update packet and send the updated update packet to the internal devices of the remote processing center.

The update packets, and updated update packets, can be sent in many forms and by many different methods including, but not limited to, Open Shortest Path First protocol (OSPF), Enhanced Interior Gateway Routing Protocol (EIGRP), Border Gateway Protocol (BGP), IP service Level Agreement (IP SLA), Static Routing, Route Tracking, interface Tracking, Enhanced Object Tracking, Object Tracking, Failover and Stateful Failover, Routing Information Protocol Version 2 (RIPv2), Hot Standby Router Protocol (HSRP), Virtual Router Redundancy Protocol (VRRP), Gateway Load Balancing Protocol (GLBP), and bidirectional forwarding detection (BFD). In some embodiments, the update packets can be customized, created, or modified. For example, "are you there" and/or "what is your status for handling transmissions right now" messages can be created and the endpoint devices can be configured to send the update packets. Typically, the update packets can be set at intervals that may be comfortable for the communications network to handle efficiently. Of note, the update packets can be messages built into or written into a vendor's code. Of note, no new hardware may be needed to implement the process 100.

In block 110, data traffic can be routed to the secondary data tunnel of the plurality of data tunnels based on the hierarchy table when the primary data tunnel experiences an issue transmitting data. For instance, an issue may be detected if either the first update packet or the second update packet is not received within a predetermined amount of time by the endpoint devices of the primary data tunnel. In one example, when an issue is detected with the primary data tunnel, a routing table for each device connected to the endpoint devices of the primary data tunnel can be updated to route traffic to the secondary data tunnel. As mentioned previously, the endpoint devices of the primary data tunnel can send out an updated update packet to each of the other endpoint and/or network and/or security devices that data traffic should be directed to another data tunnel. The other endpoint and/or network and/or security devices can then send out an update packet, or forward the previously received updated update packet, to each device connected to the endpoint devices to route data traffic to the secondary data tunnel.

As can be appreciated, the system can continuously go through the process steps to ensure that there are no issues with data transmissions.

A First Example Embodiment of a Data Traffic Management System

Figure 2:
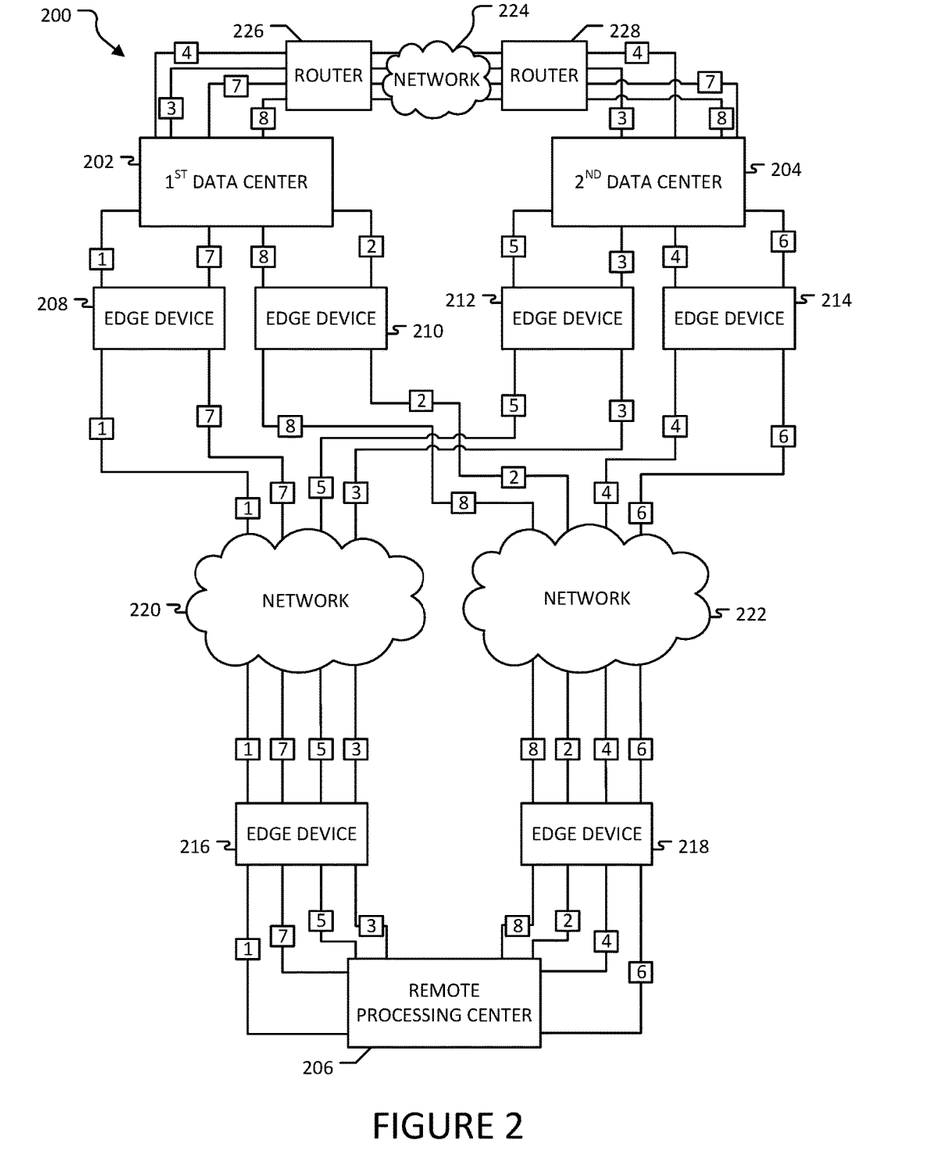
FIG. 2 is a block diagram of an example data traffic management system according to one embodiment of the present invention.

Referring to FIG. 2, a detailed diagram of a first embodiment 200 of a data traffic management system implemented in an example communications network is illustrated. In one instance, the data traffic management system can be implemented in a pre-existing communications network. In another instance, the data traffic management system can be implemented in a new communications network. It is to be appreciated that the pre-existing communications network or new communications network may include a plurality of different hardware, software, and network setups and that the included diagram is for illustrative purposes only and but one example and not meant to be limiting.

Typically, the communications network can include, but is not limited to, a first data center 202, a second data center 204, a remote processing center 206, a first edge device 208, a second edge device 210, a third edge device 212, a fourth edge device 214, a first remote edge device 216, a second edge device 218, a first intermediary network 220, a second intermediary network 222, and a third intermediary network 224. The edge devices 208-218 can include, but are not limited to, gateways, routers, network bridges, modems, wireless access points, networking cables, line drivers, switches, hubs, repeaters, multilayer switches, protocol converters, bridge routers, proxy servers, firewalls, network address translators, multiplexers, network interface controllers, wireless network interface controllers, ISDN terminal adapters and other related hardware. As can be appreciated, the edge devices 208-218 can include a combination of any of the previously mentioned network devices. Hereinafter, the edge devices 208-218 will be referred to as routers.

The intermediary networks 220-224 are typically implemented to connect the routers 208-218 together. As can be appreciated, the intermediary networks 220-224 can also be circuits or a combination of circuits and various networks. It is to be appreciated that at least two or more of the routers 208-218 could be connected to the same service provider. Alternatively, each of the routers 208-218 could be connected to different service providers. Each of the routers 208-218 can typically be connected to one or more local exchange carriers.

In communications networks implementing more than one data center, the system can implement a plurality of network devices 226-228 to connect the data centers. As shown, a first data center router 226 and a second data center router 228 can be implemented between the first data center 202 and the second data center 204. Typically, the pair of data center routers 226, 228 can be connected to one another via the third intermediary network 224.

Typically, the system 200 can include a plurality of tunnels that are built between the remote processing center 206 and the first data center 202 and the second data center 204. As shown, at least two different service providers can be implemented at each data center and communications networks (e.g., the first data center, the second data center, and the remote processing center). The tunnels can be built or created to traverse each of the service providers and their network devices. In one embodiment, the edge devices 208-218 can be implemented as endpoint devices for the data tunnels 1-8. As shown, each tunnel can include a pair of endpoint devices. Typically, a first endpoint device can be located proximate one of the data centers 202, 204 and a second endpoint device can be located proximate the remote processing center 206.

As shown, the system 200 can include eight (8) tunnels traversing through various networks between the remote processing center 206 and the two data centers 202, 204.

A first tunnel "1" can go from the remote processing center 206 to the first remote edge router 216, from the first remote edge router 216 to the first edge router 208 via the first intermediary network 220, and from the first edge router 208 to the first data center 202. A second tunnel "2" can go from the remote processing center 206 to the second remote edge router 218, from the second remote edge router 218 to the second edge router 210 via the second intermediary network 222, and from the second edge router 210 to the first data center 202. A third tunnel "3" can go from the remote processing center 206 to the first remote edge router 216, from the first remote edge router 216 to the third edge router 212 via the first intermediary network 220, from the third edge router 212 to the second data center 204, from the second data center 204 to the second data center router 228, from the second data center router 228 to the first data center router 226 via the third intermediary network 224, and from the first data center router 226 to the first data center 202. A fourth tunnel "4" can go from the remote processing center 206 to the second remote edge router 218, from the second remote edge router 218 to the fourth edge router 214 via the second intermediary network 222, from the fourth edge router 214 to the second data center 204, from the second data center 204 to the second data center router 228, from the second data center router 228 to the first data center router 226 via the third intermediary network 224, and from the first data center router 226 to the first data center 202.

A fifth tunnel "5" can go from the remote processing center 206 to the first remote edge router 216, from the first remote edge router 216 to the third edge router 212 via the first intermediary network 220, and from the third edge router 212 to the second data center 204. A sixth tunnel "6" can go from the remote processing center 206 to the second remote edge router 218, from the second remote edge router 218 to the fourth edge router 214 via the second intermediary network 222, and from the fourth edge router 214 to the second data center 204. A seventh tunnel "7" can go from the remote processing center 206 to the first remote edge router 216, from the first remote edge router 216 to the first edge router 208 via the first intermediary network 220, from the first edge router 208 to the first data center 202, from the first data center 202 to the first data center router 226, from the first data center router 226 to the second data center router 228 via the third intermediary network 224, and from the second data center router 228 to the second data center 204. An eighth tunnel "8" can go from the remote processing center 206 to the second remote edge router 218, from the second remote edge router 218 to the second edge router 210 via the second intermediary network 222, from the second edge router 210 to the first data center 202, from the first data center 202 to the first data center router 226, from the first data center router 226 to the second data center router 228 via the third intermediary network 224, and from the second data center router 228 to the second data center 204.

As can be appreciated, a plurality of tunnels can be built to ensure that data can be transferred between the remote processing center 206 and the data centers 202, 204 in case of hardware or software issues at any data transmitting locations. For instance, in a case where the first data center 202 were to lose connectivity because of the first edge router 208 going down, or having other technical issues, the system can transfer data transmissions from the first tunnel "1" to the second tunnel "2" assuming there are no issues with the second intermediary network 222 and the second edge router 210.

Figure 3A:
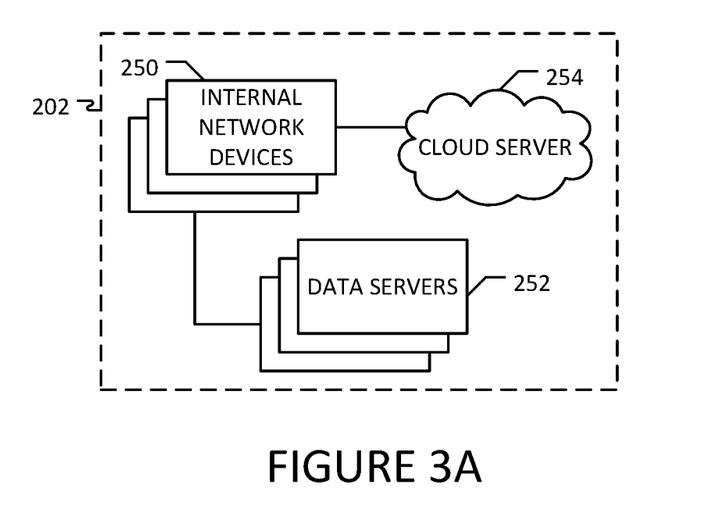
FIGS. 3A-3B are block diagrams of an example data center and remote processing center according to one embodiment of the present invention.

Referring to FIG. 3A, a block diagram of the first data center 202 is illustrated. As shown, the first data center 202 can include, but is not limited to, a plurality of internal network devices 250, a plurality of data servers 252, and one or more cloud servers 254. As can be appreciated, the second data center 204 can include components substantially similar to the first data center 202.

Figure 3B:
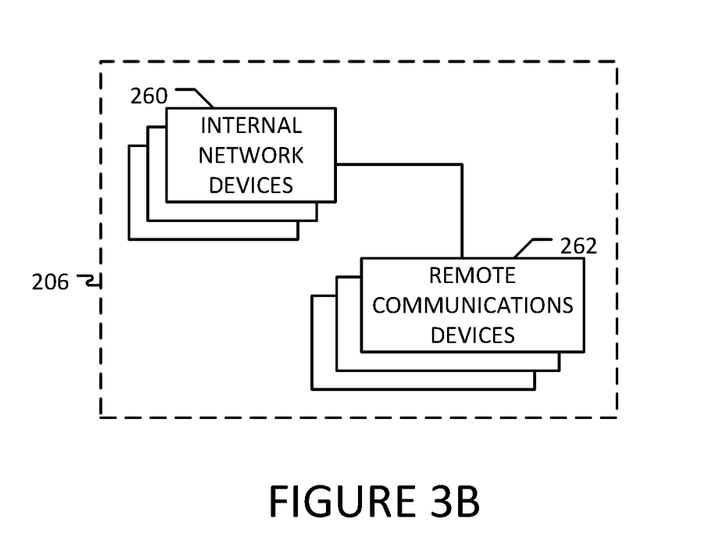

Referring to FIG. 3B, a block diagram of the remote processing center 206 is illustrated. As shown, the remote processing center 206 can include, but is not limited to, a plurality of internal network devices 260 and a plurality of remote communications devices 262.

In one example, the first data center 202 can include the first edge router 208, the second edge router 210, the first data center router 226, and the plurality of internal network devices 250 within the first data center 202. The second data center 204 can include the third edge router 212, the fourth edge router 214, the second data center router 228, and the plurality of internal network devices within the second data center 204. The remote processing center 206 can include the first remote edge router 216, the second remote edge router 218, and the plurality of internal network devices 260 within the remote processing center 206.

The routers 208-218, 224-226 can typically include a layer 3 capable network device capable of layer 3 routing and layer 3 tunneling. For instance, a layer 3 router, a layer 3 switch, or a multi-layer switch can be implemented.

The plurality of internal network devices within the first data center 202, the second data center 204, and the remote processing center 206 can include, but are not limited to, a variety of layer 2 devices, layer 3 devices, and multi-layer network and security devices. For instance, the plurality of devices can be composed of layer 2 only devices including switches, devices that can route and forward at both layer 2 and layer 3 in a single device including layer 3 switches or multi-layer switches, firewalls, security devices that function at either layer 2 only or function at layer 2 and/or layer 3, wireless access points, and/or any other layer 2, layer 3, or multi-layer network and security devices. These devices can be interconnected based on actual and particular security requirements, traffic flow requirements, application requirements, service requirements, functionality requirements, and any other architectural/design and business and technical needs of the communications network to ensure the internetwork runs in a most optimal and efficient manner possible.

The first data center 202, the second data center 204, and the remote processing center 206 can further include a plurality of internal devices, servers, and services including, but not limited to, voice servers, video servers, data servers, application servers, or any other servers/services accessed at the first data center 202, the second data center 204, and the remote processing center 206. In some instances, servers and services may access the data centers 202, 204 but be remotely located from the data centers 202, 204. Similarly, servers and services may access the remote processing center 206 but be remotely located from the remote processing center 206.

The intermediary networks 220-224 may be a service provider cloud, circuit, and/or service depending on what may be offered at a location by the service provider and what may be ordered by a user. The cloud, circuit, and/or service can include a variety of devices operating at one or all layers of the OSI and/or TCP/IP reference models. The service provider cloud, circuit, and/or service can include, but is not limited to, multi-protocol label switching (MPLS) circuit/network, asynchronous transfer mode (ATM) circuit/network, frame relay circuit/network, Ethernet circuit/network, packet over SONET circuit/network, point to point circuit/network, point to multipoint circuit/network, internet circuit/network, synchronous optical network (SONET) circuit/network, any optical carrier circuit/network, any digital signal circuit/network, any T-Carrier circuit/network, metro Ethernet circuit/network, virtual private lan service (VPLS) circuit/network, wireless wan circuit/network, and any other circuit/network that can transmit voice, video, and/or data transmissions. In some instances, there may be one or more local exchange carrier (LEC) clouds and/or other service provider clouds that are utilized within the main service provider cloud.

An Example Implementation of Failover in the Data Traffic Management System

A failover can occur when an event causes an outage of a tunnel to inhibit data from traversing the tunnel. Referring back to FIG. 2, a primary tunnel for the first data center 202 can be the tunnel "1". A primary tunnel for the second data center 204 can be the tunnel "5".

Described hereinafter is an example implementation of the data traffic management system when a tunnel experiences a failure and how the system determines which tunnel the system will switch to. The first tunnel "1" can be set as a primary tunnel for the first data center 202. If any device, circuit, or other entity that could cause an outage for the first tunnel "1" were to cause the update packets to not arrive in an allotted time frame or arrive malformed in any way, the system 200 can almost immediately remediate the issue by moving all traffic symmetrically to the second tunnel "2." If any device(s), circuit(s), or other entity/entities that could cause an outage for the first tunnel "1" and the second tunnel "2" happened at the same time, or substantially simultaneously, to cause the update packets to not arrive in their allotted time frame or arrive malformed in any way for these two tunnels, the system would almost immediately remediate by moving all traffic symmetrically to the third tunnel "3." If any device(s), circuit(s), or other entity/entities that could cause an outage for the first tunnel "1," the second tunnel "2," and the third tunnel "3" were to cause the update packets to not arrive in their allotted time frame or arrive malformed in any way for these each of the three tunnels, the system would almost immediately remediate by moving all traffic symmetrically to the fourth tunnel "4." As can be appreciated, the system can be implemented to substantially provide no (i) data outage, (ii) degradation of service, and/or (iii) re-registration.

In one embodiment, the system can update a routing table for each device necessary that is included, or not included, in each of the tunnels when traffic needs to be moved from one tunnel to another tunnel. For instance, the system can update the routing table for every necessary device included in one of the tunnels and all devices outside the tunnel that necessitate an updated routing table at the time. In one instance, the system can update all of the devices' routing tables, and/or forwarding tables, and if necessary, connection tables. Each devices' tables can be updated and optimized accordingly throughout the entire network, and therefore transmission links/paths are switched and optimized for every device in the network, as soon as the system detects an issue and begins remediating the issue so that the outage can be fully avoided and there are limited to no performance impacts to voice, video, and data transmissions.

In one embodiment, when an outage occurs, each of the proper network devices in a transmission path can be notified almost immediately of the outage and then the devices can be updated and optimized. Updating the devices can include, but is not limited to, making changes to remove, add, and/or adjust qualities or placement of a route or other address. Optimizing the devices can include, but is not limited to, ensuring that the most optimal path can still be taken for the data transmissions. For instance, the system can update and optimize each devices' routing tables, forwarding tables, and/or their connection tables such that as soon as they receive a next update packet the devices are able to transmit in a direction (e.g., through another tunnel) that avoids the outage, while at the same time ensuring that the link (or tunnel) can be optimal and is not going to inject unnecessary latency/delay or jitter into the data transmissions.

The system can make use of many different routing protocols and/or technologies to aid in the process of updating all necessary devices' routing tables, and/or forwarding tables, and if necessary connection tables. For instance, the system can implement, but is not limited to implementing, open shortest path first protocol (OSPF), enhanced interior gateway routing protocol (EIGRP), border gateway protocol (BGP), IP service level agreement (IP SLA), static routing, route tracking, interface Tracking, Enhanced Object Tracking, Object Tracking, failover and stateful failover, routing information protocol version 2 (RIPV2), hot standby router protocol (HSRP), virtual router redundancy protocol (VRRP), gateway load balancing protocol (GLBP), bidirectional forwarding detection (BFD), and/or customized, created, or modified "are you there and what is your status for handling transmissions right now" messages. Typically, when the system is being implemented in the pre-existing communications network, one or more messages can be built into a vendor's code and/or configuration. For instance, a vendor may allow the system to modify their code or configuration if needed, or any other protocol or technology that a vendor or client may prefer to assist with these updates.

The updates that are sent out by the system can be sent between endpoint devices of the data tunnels. For instance, the first tunnel "1" can be terminated at the first edge router 208 of the first data center 202 and at the first remote edge router 216 of the remote processing center 206. The update messages (or update packets) can be sent between these two endpoint devices for the first tunnel "1". The update messages and the mechanisms utilized for updates, routing, and forwarding between devices in the internetwork can be sent, come in, and operate in many forms. These can include, but are not limited to, Open Shortest Path First protocol (OSPF), Enhanced Interior Gateway Routing Protocol (EIGRP), Border Gateway Protocol (BGP), IP service Level Agreement (IP SLA), Static Routing, Route Tracking, interface Tracking, Enhanced Object Tracking, Object Tracking, Failover and Stateful Failover, Routing Information Protocol Version 2 (RIPv2), Hot Standby Router Protocol (HSRP), Virtual Router Redundancy Protocol (VRRP), Gateway Load Balancing Protocol (GLBP), bidirectional forwarding detection (BFD), customized, created, or modified update packets.

For each pair of endpoint devices for the plurality of data tunnels, update packets (or update messages) can be sent by the two endpoint devices to one another. In one instance, the endpoint devices can be implemented as network termination points. The update packets can be sent from one endpoint device (e.g., the first edge router 208) to the other endpoint device (e.g., the first remote edge router 216). The system can track each and every device, cable, conduit, and every other entity that can be located between the two endpoint devices and include the pair of endpoint devices.

In one example, when the first edge router 208 sends update packets, the first edge router 208 can send the update packet out on its wire and the update packet can traverse every device, cable, conduit, and every other device that is between the first edge router 208 and the first remote edge router 216. Of note, this may include all service provider gear as well as all local exchange carrier (LEC) gear of each local exchange carrier implemented in the communications network. Typically, each device located between the pair of endpoint devices can transmit the update packets to a device that has been preprogrammed to receive update packets based on a routing table, a forwarding table, a connection table, and/or any other table the device may use to transmit update packets. The update packets can be sent bi-directionally between endpoint devices. For instance, the first edge router 208 can be configured to send an update packet to the first remote edge router 216. The first remote edge router 216 can be configured to send an update packet to the first edge router 208. Once an endpoint device finally receives the update packet, the endpoint device can analyze the update packet to ensure that the update packet is not malformed and ensure that the update packet arrived in a predetermined amount of time. In one instance, the system can be pre-configured (or pre-programmed) with the predetermined amount of time. The update packet can let the endpoint device know that the status of the other endpoint device that sent the packet, as well as a status of every other entity that makes up the data tunnel, is not only available, but is also operating at optimal performance to place traffic on.

Each created data tunnel can be implemented to logically test every device, cable, conduit, and every other entity in a path from a first endpoint device to a second endpoint device. As mentioned previously, the endpoint devices can also test themselves and each other. The endpoint devices can be connected to equipment at their respective locations. For instance, the first edge router 208 can be connected back to other devices included in the first data center 202. The devices included in the first data center 202 and the devices in the remote processing center 206 can be pre-programmed, pre-configured, and interconnected physically with the first edge router 208 and the first remote edge router 216, respectively. When the first edge router 208 and/or the first remote edge router 216 do not receive an expected update packet in the time the update packet should be received, or the update packet is malformed in any way, then the two endpoint devices may immediately tear down the currently traversed tunnel and update routing tables, forwarding tables, connection tables, and any other tables that need to be updated. The endpoint devices may then immediately update (e.g., by removing and/or updating their routing tables, forwarding tables, connection tables, or any other tables, if necessary) the devices in their particular internal networks so that those internal devices are configured to process and send future data packets to a tunnel that may be operating optimally. For instance, the endpoint devices may generate an updated update packet including directions to route data traffic to another tunnel.

As a device(s) in the failed data tunnel recover then data traffic may be placed back on the previously torn down data tunnel. Typically, data traffic can be placed on the previously torn down data tunnel if the devices part of the data tunnel are higher up in the hierarchy table than a currently implemented data tunnel.

In one embodiment, the entire internetwork of either the first data center 202 and/or the remote processing center 206 can be silently updated by allowing the internal devices to continue to forward to their preferred device and then the first edge router 208 and/or the remote edge router 216 utilizing a new preferred tunnel.

As can be appreciated, most organizations may utilize one data center for some processing while a second data center can be simultaneously used for other processing to utilize bandwidth efficiency.

The traffic that utilizes the second data center 204 as a primary data center, the fifth tunnel "5" can be the primary tunnel. If any device, circuit, or other entity that could cause an outage for the fifth tunnel "5" were to cause the update packets to not arrive in their allotted time frame or arrive malformed in any way, the system would almost immediately remediate by moving all traffic symmetrically to the sixth tunnel "6." If any device(s), circuit(s), or other entity/entities that could cause an outage for the fifth tunnel "5" and the sixth tunnel "6" happened at substantially the same time to cause the update packets to not arrive in their allotted time frame or arrive malformed in any way for these two tunnels, the system would almost immediately remediate by moving all traffic symmetrically to the seventh tunnel "7." If any device(s), circuit(s), or other entity/entities that could cause an outage for the fifth tunnel "5," the sixth tunnel "6," and the seventh tunnel "7" were to cause the update packets to not arrive in their allotted time frame or arrive malformed in any way for these each of these three tunnels, the system would immediately remediate by moving all traffic symmetrically to the eighth tunnel "8."

Of significant note, all data traffic can remain symmetric through all failover scenarios and all the tunnels can be continuously monitored by the system. Further, all connection establishments through all devices (e.g., firewalls) can also be maintained and remain symmetric so there are no outages as a result of stateful firewalls. In one embodiment, all tunnels with a lower tunnel number have priority over tunnels with a numerically higher number for a particular data center. For instance, the first tunnel "1" can have precedence over the second through fourth tunnel for the first data center. For example, if the first tunnel "1" goes down and then the second tunnel "2" and the third tunnel "3" were to go down, the system can switch all data traffic to the fourth tunnel "4." Then, if the system determines that the first tunnel "1" has come back up and the second tunnel "2" and the third tunnel "3" remain down, the system can move the data traffic back to the primary tunnel (e.g., the first tunnel "1"). As can be appreciated, the first tunnel "1" can be placed back into production as primary tunnel with no impact to services at all. As can be appreciated for the second data center, the fifth tunnel "5" would have precedence over the sixth to eighth tunnels.

It is to be appreciated that depending on a particular scenario, the above examples are not an all-inclusive listing of all of the failover logic, scenarios, or functionality for the system.

The above described process for determining which tunnel to transfer data transmissions to and how the transfer is made can provide a plurality of benefits, as described hereinafter. The system can be implemented to ensure that there is no asymmetric routing before, during, and after a failure. As can be appreciated, asymmetric routing can create poor performance (e.g., increasing latency/delay and jitter) of transmissions, especially when asymmetric routing occurs over multiple provider networks. Further, asymmetric routing can create a complete loss of connectivity and loss of service due to a firewall, or another device's, stateful failure. Asymmetric routing can also make it very hard to troubleshoot during outages and can make it very hard to ensure proper restoration after original primary circuits come back up.

The system can be implemented to ensure that routing and transmission paths taken by all packets before, during, and after failover are optimal and do not become suboptimal at any time before, during, or after these transitions and failover situations occur. Suboptimal routing can create very poor quality of voice and video performance since it almost always injects additional unnecessary latency/delay and jitter into the routing paths.

The system can be implemented to ensure that no packets are blackholed due to lack of routing, forwarding, and connection knowledge of source and/or destination when a failover situation has occurred, which can cause a complete loss of connectivity and service. The system can also ensure that when the primary circuit is back up and operational, no outages occur when traffic is placed on the primary circuit again.

The system can be implemented to ensure that no packets are dropped due to firewalls not already having proper state information in their connection tables during and after a failover situation. In such a situation, this could cause a complete loss of connectivity and service for all current flows/traffic transmissions which would have to build new connection entries after their previous connection entries were torn down due to initial non-existence on a new firewall or other device with firewall services running.

The system can be implemented to ensure that even when multiple circuits or devices fail in the environment, that voice, video, and data transmissions and traffic flow are seamlessly transitioned to the still available circuits and devices while ensuring that registrations from remote sites to voice, video, and data resources (Servers or other Resources) at a particular Data Center, or registered on another network, do not have to re-register these registrations to a different Data Center or different Network during a multi-circuit outage. Not having JG Logic would force remote site users to have to re-register to a different Data Center or to a different Network and would cause complete outages for end users needing a service while this re-registration occurs.

The system can be implemented to ensure that when a primary circuit, or any other circuit, is flapping (e.g., going up and down continuously causing continuous traffic pattern changes and instability on the network) that all the appropriate network devices immediately or already have their routing tables, forwarding tables, and connection tables updated so that the instability is not seen by an end user.

A Second Example Embodiment of a Data Traffic Management System

Figure 4:
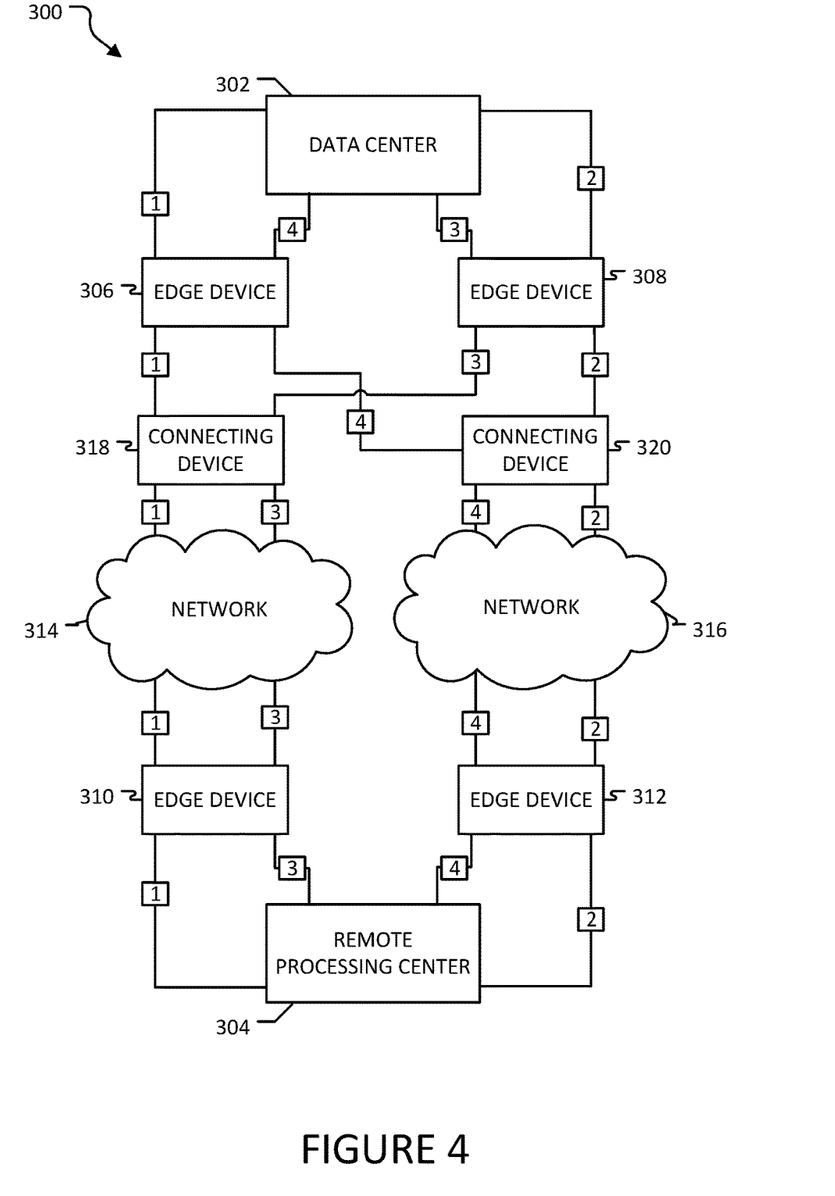
FIG. 4 is a block diagram of an example data traffic management system according to one embodiment of the present invention.

Referring to FIG. 4, a detailed diagram of a second embodiment 300 of a data traffic management system implemented in an example communications network is illustrated.

Typically, the communications network can include, but is not limited to, a data center 302, a remote processing center 304, a first edge device 306, a second edge device 308, a first remote edge device 310, a second edge device 312, a first intermediary network 314, a second intermediary network 316, a first connecting device 318, and a second connecting device 320. Each of the components of the second embodiment data traffic management system 300 can be implemented to similar components of the first embodiment data traffic management system. Further, the data center 302 and the remote processing center 304 may both include a plurality of internal network devices directly connected, or indirectly connected, to the edge devices 306-312. For instance, the edge devices 306-312 can include, but are not limited to, gateways, routers, network bridges, modems, wireless access points, networking cables, line drivers, switches, hubs, repeaters, multilayer switches, protocol converters, bridge routers, proxy servers, firewalls, network address translators, multiplexers, network interface controllers, wireless network interface controllers, ISDN terminal adapters and other related hardware. Hereinafter, the edge devices 306-312 will be referred to as routers.

As shown, a first data tunnel "1", a second data tunnel "2", a third data tunnel "3", and a fourth data tunnel "4" can be created between the data center 302 and the remote processing center 304. In one embodiment, the routers 306-312 can be implemented as endpoint devices for the data tunnels. For instance, the first edge router 306 can be a first endpoint device for the first data tunnel "1" and the first remote edge router 310 can be a second endpoint device for the first data tunnel "1". For the second data tunnel "2", the second edge router 308 can be a first endpoint device and the second remote edge router 312 can be a second endpoint device. For the third data tunnel "3", the second edge router 308 can be a first endpoint device and the first remote edge router 310 can be a second endpoint device. For the fourth data tunnel "4", the first edge router 306 can be a first endpoint device and the second remote edge router 312 can be a second endpoint device.

After the data tunnels have been created, a hierarchy table can be provided and stored on each of the endpoint devices. The hierarchy table can include a prioritized table for each of the data tunnels and may further include a current status of each of the data tunnels. For instance, the hierarchy table may list the first data tunnel "1" as a primary tunnel in the hierarchy table. Of note, a priority of the data tunnels can be based on a variety of factors and may be updated based on the data center 302 and the remote processing center 304. Typically, if there is an issue with a currently active data tunnel affecting data traffic, the endpoint devices can refer to the hierarchy table to determine which data tunnel to direct traffic to. In this example, the hierarchy table can list the first data tunnel "1" as the primary tunnel, the second data tunnel "2" as the secondary tunnel, the third data tunnel "3" as the tertiary tunnel, and the fourth data tunnel "4" as the quaternary tunnel. As can be appreciated, the listing of these data tunnels in the hierarchy table is for illustrative purposes only and not meant to be limiting. The hierarchy table may further include a current status indicator for each of the data tunnels to ensure data traffic is not routed to a data tunnel experiencing issues transmitting data packets.

Once the data tunnels have been created and the endpoint devices have been configured, data traffic can be directed or routed to the primary data tunnel in the hierarchy table. For instance, the endpoint devices of each of the data tunnels can check the hierarchy table and determine which data tunnel is the primary data tunnel to receive data traffic.

Each of the endpoint devices 306-312 can be configured to monitor the data tunnels for any issues with data traversing the data tunnels. In one embodiment, the endpoint devices 306-312 can be configured to continuously send update packets between themselves at predetermined time intervals. The endpoint devices 306-312 can further be configured to determine if the update packets were received within a predetermined amount of time. Typically, each pair of endpoint devices can send and receive update packets and determine if the update packets were received within the prescribed amount of time. For instance, the first endpoint device (the first edge router 306) of the first data tunnel "1" can continuously send an update packet at predetermined intervals to the second endpoint device (the first remote edge router 310). Similarly, the second endpoint device can continuously send an update packet to the first endpoint device. The first endpoint device and the second endpoint device can each be configured to determine if the update packets from the other endpoint device was received in a predetermined amount of time or if the update packet is malformed in any manner. When both of the endpoint devices determine the update packets were received in time and not malformed, the endpoint devices can take no further action. If either the first endpoint device or the second endpoint device determines an update packet was late or malformed, the endpoint device can immediately send an updated update packet to each of the other endpoint and/or network and/or security devices. Further, the updated update packet can be sent to each of the internal networking devices of both the data center 302 and the remote processing center 304. The updated update packet can include information that the first data tunnel "1" is experiencing issues and that data traffic should be routed to the secondary data tunnel based on the hierarchy table. Assuming there are no issues with the secondary data tunnel, data traffic can then be routed to the secondary data tunnel.

Typically, each pair of endpoint devices can continuously send update packets and determine if they update packets are received within the predetermined time and/or not malformed. For instance, if data traffic is traversing the first data tunnel "1", the endpoint devices of the second, third, and fourth data tunnels can continuously monitor their data tunnels to see if there are any issues with said data tunnels. For example, the secondary data tunnel may experience issues while data traffic is traversing the primary data tunnel. In such an example, the hierarchy table may be updated with a current status of each of the data tunnels. Therefore, when the endpoint devices reference the hierarchy table to determine which data tunnel data traffic may be routed to, the endpoint devices can know that the secondary data tunnel is currently experiencing issues. If the primary data tunnel then experiences an issue, the endpoint devices will know that the secondary data tunnel is down and data traffic should be routed to the tertiary data tunnel.

When data traffic has been routed to one of the data tunnels other than the primary data tunnel, the endpoint devices of the primary data tunnel can continuously send the update packets to determine when the primary data tunnel is transmitting data normally again. Once the endpoint devices of the primary data tunnel determine the primary data tunnel is back to transmitting data normally, the endpoint devices of the primary data tunnel can send an update packet to the other endpoint and/or network and/or security devices indicating the primary data tunnel is operating normal and data traffic may be routed back to the primary data tunnel.

In some embodiments, the connecting devices 318, 320 can be implemented as connecting points to bring in two or more data tunnels into the data center 302. Typically, the connecting devices 318, 320 can include, but are not limited to, a layer 2 only device, a layer 3 only device, a multi-layer network device, and/or a multi-layer security device. A layer 2 only device may include a switch. A layer 3 only device may include a router. The connecting devices 318, 320 may include a device that can route and forward at both layer 2 and layer 3. For instance, a layer 3 switch, a layer 3 multi-layer switch, a firewall, or other security devices that may function at either layer 2 only or at layer 2 and/or layer 3, a wireless access point, and any other layer 2, layer 3 devices.

The connecting devices 318, 320 may be implemented to allow for a formation of two or more data tunnels. The connecting devices 318, 320 may further add in additional enhancements and protections in the event of a misconfiguration or multiple misconfigurations on a certain device or devices, which can be very costly. The connecting devices 318, 320 may also protect against, but are not limited to protecting against, certain physical hardware and/or software failures in the communications network, among other failures that can occur.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of managing data traffic in a communications network, the method comprising:
   creating a plurality of data tunnels, the plurality of tunnels each including a first endpoint device and a second endpoint device;
   providing a hierarchy table for the plurality of data tunnels;
   routing data traffic to a primary data tunnel of the plurality of data tunnels based on the hierarchy table;
   continuously sending a first update packet from the first endpoint device to the second endpoint device for each of the plurality of tunnels;
   continuously sending a second update packet from the second endpoint device to the first endpoint device for each of the plurality of tunnels;
   continuously determining if the first update packet was received by each of the second endpoint devices;
   continuously determining if the second update packet was received by each of the first endpoint devices;
   routing data traffic to a secondary data tunnel of the plurality of data tunnels based on the hierarchy table when either the first update packet or the second update packet are not received in a predetermined amount of time by the endpoint devices of the primary data tunnel.

2. The method of claim 1, the method further comprising:
   updating a routing table of each endpoint device and each device connected to the endpoint devices of the primary tunnel to route data traffic to the secondary tunnel.

3. The method of claim 1, the method further comprising:
   updating a forwarding table of each endpoint device and each device connected to the endpoint devices of the primary tunnel to route data traffic to the secondary tunnel.

4. The method of claim 1, the method further comprising:
   updating a connection table of each endpoint device and each device connected to the endpoint devices of the primary tunnel to route data traffic to the secondary tunnel.

5. The method of claim 1, the method further comprising:
   altering a forwarding path of each endpoint device and each device connected to the endpoint devices of the primary tunnel to route data traffic to the secondary tunnel.

6. The method of claim 1, the method further comprising:
   continuously sending the first update packet from the first endpoint device to the second endpoint device for each of the plurality of tunnels;
   continuously sending the second update packet from the second endpoint device to the first endpoint device for each of the plurality of tunnels;
   continuously determining if the first update packet was received by each of the second endpoint devices;
   continuously determining if the second update packet was received by each of the first endpoint devices;
   routing data traffic to the primary data tunnel of the plurality of data tunnels when the first update packet and the second update packet are received in a predetermined amount of time by the endpoint devices of the primary data tunnel.

7. The method of claim 1, wherein the communications network includes:
- at least one data center, the at least one data center including at least two edge devices each implemented as one of the plurality of endpoint devices;
- at least one remote processing center, the at least one remote processing center including at least two edge devices each implemented as one of the plurality of endpoint devices; and
- at least two intermediary networks connecting the edge devices together.

8. The method of claim 7, wherein the plurality of data tunnels traverse between the at least two edge devices of the at least one data center and the at least two edge devices of the at least one remote processing center.

9. The method of claim 1, wherein the hierarchy table is stored on each of the endpoint devices.

10. The method of claim 1, wherein the endpoint devices determine if the update packets are received within the predetermined amount of time.

11. The method of claim 1, further comprising:
- generating an updated update packet when either the first endpoint device or the second endpoint device determines the update packet was received after the predetermined amount of time; and
- sending the updated update packet to each of the endpoint devices of the plurality of data tunnels.

12. The method of claim 11, wherein the updated update packet includes instructions to reference the data tunnel hierarchy table for determining which of the plurality of data tunnels to route data traffic to.

13. The method of claim 11, wherein (i) the first endpoint device sends the updated update packet to each device connected to the first endpoint device; and (ii) the second endpoint device sends the updated update packet to each device connected to the second endpoint device.

14. A method of managing data traffic, the method comprising:
- creating a plurality of data tunnels in a communications network, the communications network including:
  - at least one data center, the at least one data center including at least two edge devices each being a first endpoint device of the plurality of data tunnels;
  - at least one remote processing center, the at least one remote processing center including at least two remote edge devices each being a second endpoint device of the plurality of data tunnels;
  - wherein the plurality of data tunnels traverse between the at least two edge devices of the at least one data center and the at least two remote edge devices of the at least one remote processing center;
- continuously sending a first update packet from a first endpoint device to a second endpoint device of a primary data tunnel;
- continuously sending a second update packet from the second endpoint device to the first endpoint device of the primary data tunnel;
- determining if the first update packet was received by the second endpoint device in a predetermined amount of time;
- determining if the second update packet was received by the first endpoint device in a predetermined amount of time;
- updating a routing mechanism of each of the endpoint devices of the plurality of data tunnels to route data traffic to a secondary data tunnel of the plurality of data tunnels when either the first update packet or the second update packet are not received in the predetermined amount of time.

15. The method of claim 14, wherein (i) the at least one data center includes a plurality of internal devices connected to the at least two edge devices; and (ii) the at least one remote processing center includes a plurality of internal devices connected to the at least two remote edge devices.

16. The method of claim 15, wherein the first endpoint device of the primary data tunnel sends an updated update packet to each of the internal devices connected to the at least two edge devices, the updated update packet including instructions to route data traffic to the secondary data tunnel.

17. The method of claim 15, wherein the second endpoint device of the primary data tunnel sends an updated update packet to each of the internal devices connected to the at least two remote edge devices, the updated update packet including instructions to route data traffic to the secondary data tunnel.

18. The method of claim 14, wherein the routing mechanism is selected from the group consisting of a routing table, a forwarding table, and a connection table.

19. The method of claim 14, wherein the routing mechanism includes a forwarding path.

20. A method of managing data traffic in a communications network, the method comprising:
- creating a plurality of data tunnels in the communications network;
- modifying a plurality of edge devices in the communications network to be endpoint devices for the plurality of data tunnels, each of the plurality of data tunnels including a pair of endpoint devices;
- storing a data tunnel hierarchy table in each of the endpoint devices, the data tunnel hierarchy table including a prioritized list of each of the plurality of data tunnels;
- modifying a first endpoint device of each pair of endpoint devices to continuously send a update packet to a second endpoint device of each pair of endpoint devices;
- modifying the second endpoint device of each pair of endpoint devices to continuously send the update packet to the first endpoint device of each pair of endpoint devices;
- modifying the first endpoint device of each pair of endpoint devices to determine if the update packet was received in a predetermined amount of time from the second endpoint device;
- modifying the second endpoint device of each pair of endpoint devices to determine if the update packet was received in a predetermined amount of time from the first endpoint device;
- modifying each of the endpoint devices to generate an updated update packet when determining the update packet was received after the predetermined amount of time;
- wherein the updated update packet includes instructions to reference the data tunnel hierarchy table for directing data traffic to another data tunnel; and
- modifying each of the endpoint devices to send the updated update packet to devices connected to the endpoint device.

* * * * *